United States Patent [19]

Schultz

[11] 4,045,049
[45] Aug. 30, 1977

[54] BUBBLE-MAKING APPARATUS AND MEANS FOR ATTACHMENT TO A BICYCLE

[76] Inventor: Arthur Harry Schultz, 6003 Louis Drive, North Olmsted, Ohio 44070

[21] Appl. No.: 576,003

[22] Filed: May 9, 1975

[51] Int. Cl.² .............................................. A63H 33/28
[52] U.S. Cl. ...................................... 280/289 R; 46/8; 273/101
[58] Field of Search .......................... 46/6, 7, 8, 53, 44, 46/91; 280/289 R

[56] References Cited

U.S. PATENT DOCUMENTS

| 2,628,449 | 2/1953 | Raizen | 46/7 |
| 2,721,421 | 10/1955 | Steele | 46/175 R |
| 2,805,515 | 9/1957 | Gans et al. | 46/7 |
| 3,100,947 | 8/1963 | Hellman | 46/8 |
| 3,708,909 | 1/1973 | Winston | 46/7 |

FOREIGN PATENT DOCUMENTS

| 31,015 | 12/1932 | Denmark | 46/44 |

Primary Examiner—F. Barry Shay
Attorney, Agent, or Firm—Woodling, Krost, Granger & Rust

[57] ABSTRACT

A bubble-making apparatus which includes in combination a container for containing a bubble-making solution. A paddle wheel with blades is rotatably mounted to the container walls for movement in a circumferential path into and out of the container. The blades have a flat surface extending generally transverse to the direction of the circumferential path of travel. Openings are located in the end portions of each of the blades providing means for producing a bubble from the bubble-making solution. Relative air flow producing means are provided for exerting an air force against the flat surface of each of the blades in a direction which is transverse to the flat surface and to the extent of the pivot means, to cause rotation of the paddle wheel as aforementioned. Also disclosed are games including the steps of making a bubble and blowing the bubble from the place where made to a designated destination. The designated destination may include a post member having a sharp point on the end so that the purpose of the same is to impinge the bubble on the sharp point to break the same or the designated destination may include an entranceway through which a bubble is blown. The game may, also, include a grid member located at the designated destination and the bubbles are blown on to the grid. The means of moving the bubble may be by means of a hand-held fan.

8 Claims, 11 Drawing Figures

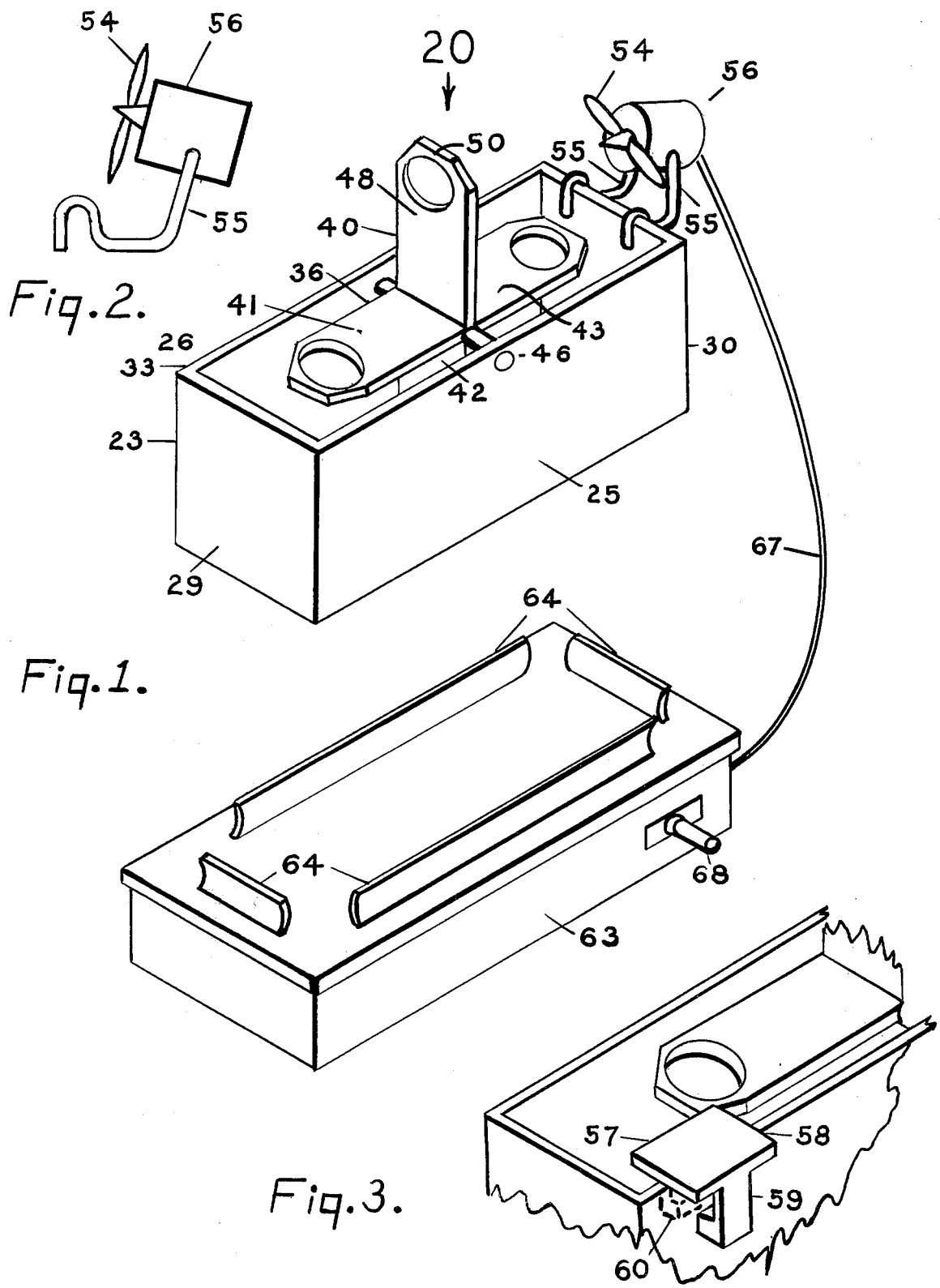

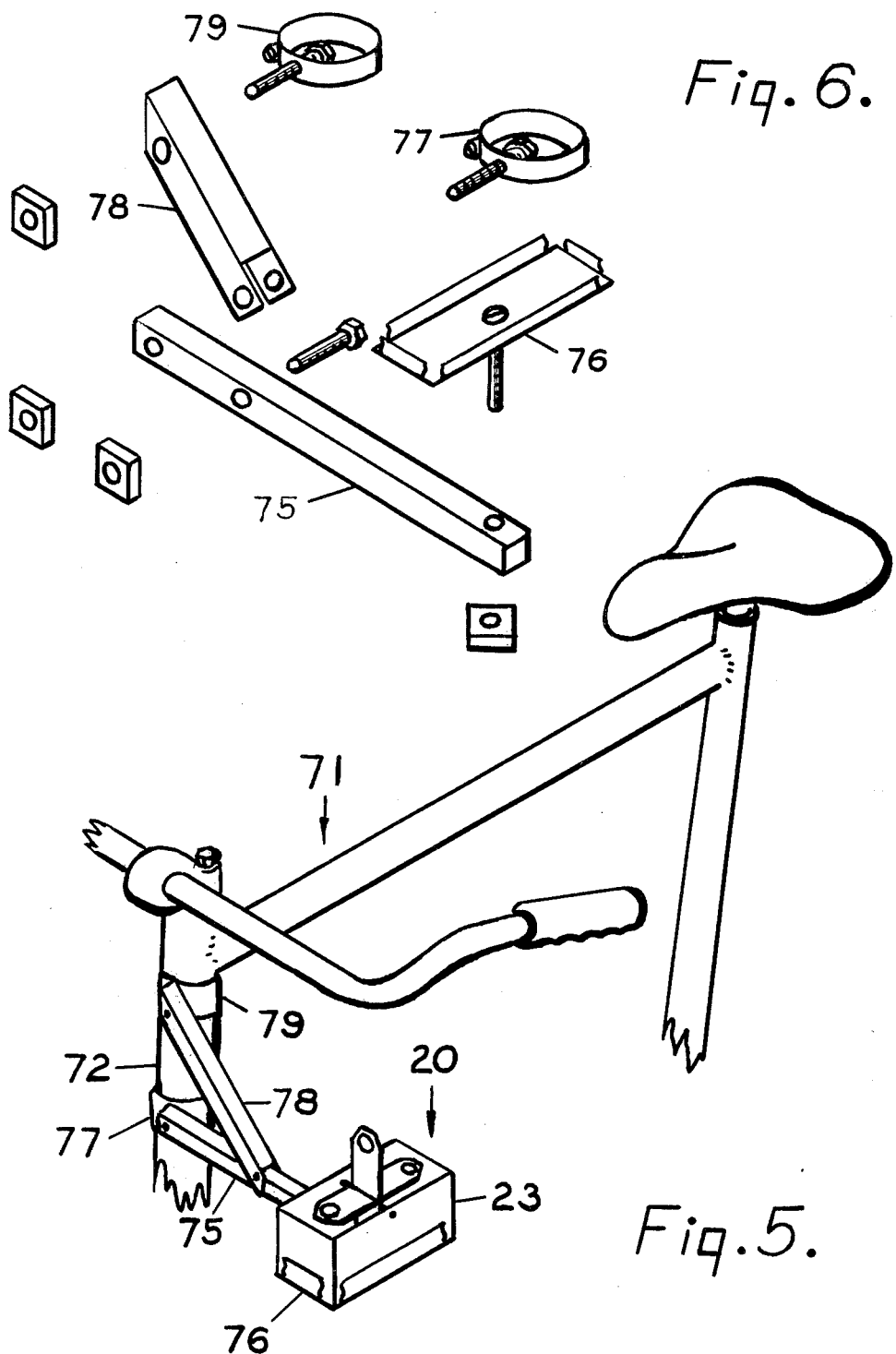

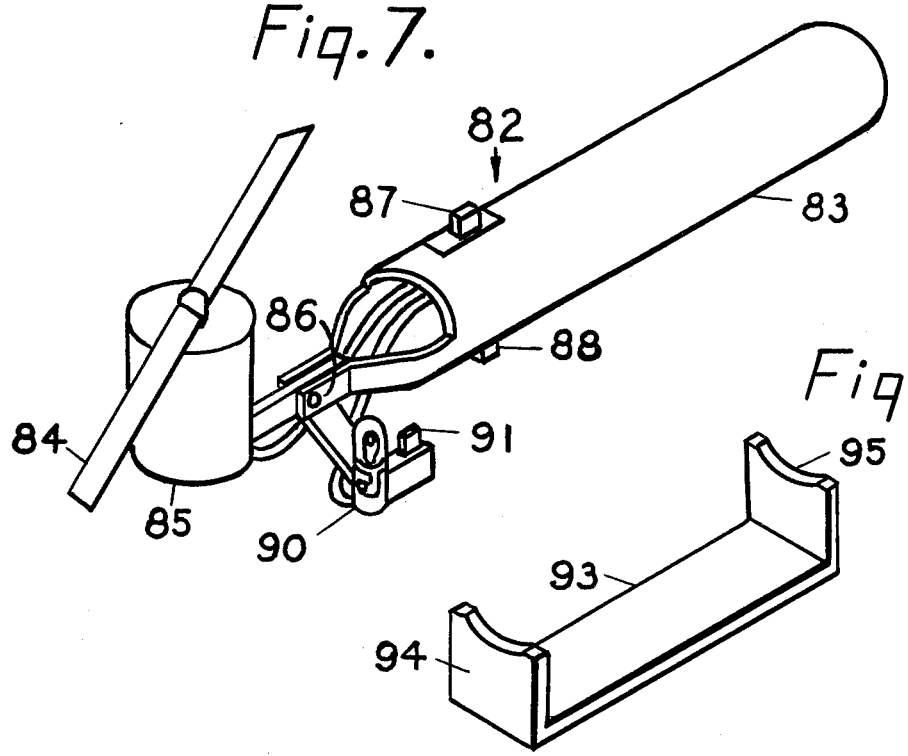
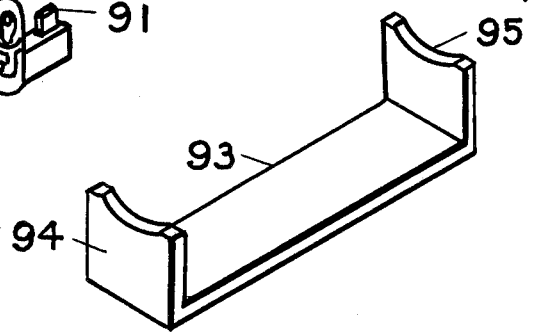
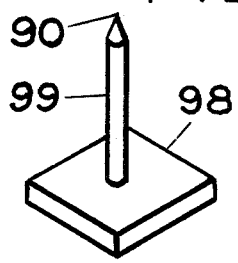
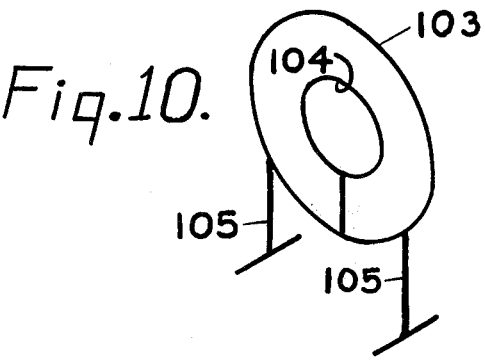
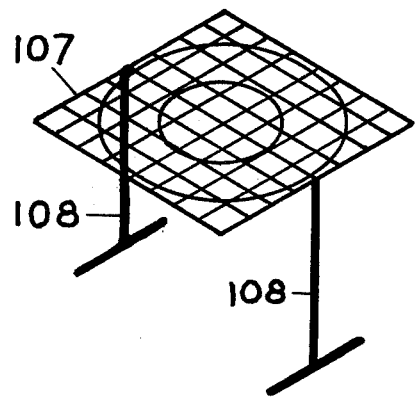

BUBBLE-MAKING APPARATUS AND MEANS FOR ATTACHMENT TO A BICYCLE

The prior art is replete with constructions for the purpose of producing bubbles which bubbles are primarily produced for their entertainment value. Examples of the prior art structures are found in the following listed U.S. Pat. Nos.:

2,412,732; 2,987,847; 3,708,909; 2,862,320; 3,008,263.

These prior devices all operate basically on the same principal which involves the utilization of a blade-type apparatus somewhat in the nature of a propeller blade mechanically secured to a loop-type of structure, which is alternately moved into and out of a bubble solution. An air stream blowing against the loop produces a bubble. In all of these prior art devices the pivot or pivot means, which serves to rotatably mount the propeller and the loop-type of device, is arranged so that the direction of the air from the fan or other air-producing device is in the same direction as the pivot and the path of rotation of the loop and the propeller which carries it is at right angles or normal to the direction of the air.

These prior devices suffer from the frailty that the movement of the loop into the bubble-making solution serves only one function and that is to immerse the loop in the bubble solution to subsequently produce a bubble. However, little or no braking effect is provided to the movement of the loop and the speed of rotation of the propeller and loop is primarily determined by the pitch of the propeller blades and the speed of the air exerted against the same. The prior art devices disclosed in the above referred to patents, also, suffer from the problem that the loops, which produce the bubbles move into the air stream in a lateral or transverse direction, which produces an uneven force against the loops or openings thereby at times failing to produce a bubble.

The present invention overcomes the frailties of the prior art in that the direction of rotation of the loop devices is generally in line or in the same direction as the air flow which is produced from the air producing means. The present device does not have the loop mechanism move laterally into the air stream, but the loop devices are moved generally in the same direction as the air stream. Additionally, the blades or loop devices which produce the bubbles in the present device each have a flat engaging surface for engagement of the air stream, which blades alternately pass into and out of the bubble-making solution. As these blades move into the bubble-making solution they perform the function of limiting the rotative speed of the paddle wheel and creating a greater relative speed between the loops and the air stream which passes through the loops to produce the bubbles. These basic differences in the operation of the present device over those of the prior art, produce a bubble-making apparatus which is not only more compact and economical to manufacture; but, also, functions in a substantially more reliable fashion.

The present invention, also, devotes itself to the teaching of several games which can be played with the bubbles produced from the apparatus of the present invention or from bubbles produced in any other manner. The games disclosed in the present invention include basically the steps of making a bubble and blowing the bubble from the place where made to a designated destination. The designated destination may include various structures and for example may include a post-like member having a sharp end with the object of the game being the impinging of the bubble onto the sharp member so as to break the same. The designated destination may, also, include an annular entranceway somewhat in the nature of a basketball hoop with the object of the game being to blow the bubble through the entranceway. The designated destination may, also, include a grid upon which the bubble or a plurality of bubbles are to be blown to produce a stack of the same. The games that may be played may include various combinations of the above, as for example the imposition of various obstacles between the place where the bubble is made and the final designated destination. For the sake of example, one might make the object of the game the transporting of the bubble through a hoop-type member and finally to the pointed or sharp member at the designated destination where it is broken. The bubbles may be transported between the place where made to the designated destination by means of a hand-held fan.

Other objects and a fuller understanding of this invention may be had by referring to the following description and claims, taken in conjunction with the accompanying drawings, in which:

FIG. 1 is an exploded isometric view of the bubble-making apparatus of the present invention and the base upon which it is adapted to rest;

FIG. 2 is a side elevational view of the fan which is shown in FIG. 1;

FIG. 3 is a fragmentary view partially in section showing a brake mechanism which may be utilized to prevent rotation of the paddle wheel which is shown in FIG. 1;

FIG. 5 is a fragmentary isometric view showing the bubble-making apparatus of the present invention as mounted on a bicycle;

FIG. 6 is an exploded isometric view showing the means of mounting the bubble-making apparatus of the invention on the bicycle shown in FIG. 5;

FIG. 7 is an isometric view of a hand-held fan, which is battery powered and which may be utilized in moving the bubbles produced in the apparatus of FIG. 1;

FIG. 8 is a support member for resting the hand-held fan of FIG. 7, when the fan is not in use or when one desires to use the fan in a fixed position;

FIG. 9 is a structure which is located at a designated destination when playing a game in accordance with the teachings of the present invention;

FIG. 10 illustrates another structure that can be utilized in place of the structure of FIG. 9; and FIG. 11 is a still further structure that can be utilized in place of or with the structures shown in FIGS. 9 and 10.

Figure 4:
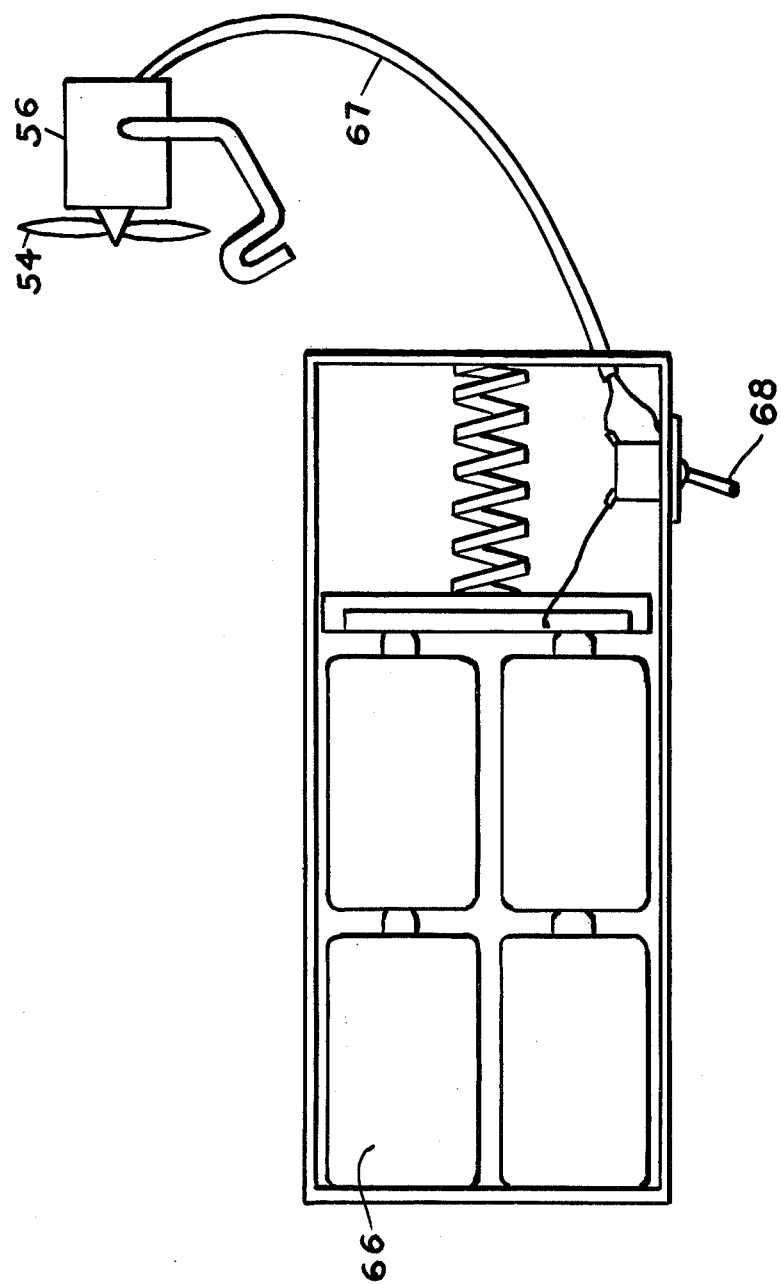
FIG. 4 is a plan view of the base shown in FIG. 1 with the cover of the base removed.

The present invention includes a bubble-making apparatus indicated generally by the reference numeral 20 which includes in combination a generally rectangularly-shaped container 23 which has first and second spaced and generally parallel sidewalls 25 and 26 and first and second spaced and generally parallel endwalls 29 and 30, which connect opposed ends of the sidewalls 25 and 26 together. The upper perimeter 33 of the four sidewalls defines an opening into the container. In operation the container 23 is filled with a bubble-making solution to an appropriate level, which for example might be on the order of slightly below the top edge of the container.

A paddle wheel 36 is provided which has four blades identified by the reference numerals 40, 41, 42 and 43 and these four blades are all connected together at a central location and the adjacent blades of the paddle wheel are spaced from each other on the order of ninety degrees. Pivot means 46 in the nature of a shaft member extends through the central location of the paddle wheel and is connected to the same in a fixed manner. Opposed ends of the pivot means 46 extend into openings in the sidewalls 25 and 26. In this particular embodiment the pivot means 46 is designed to rotate in the openings in the sidewalls. This rotatably mounts the paddle wheel so that the blades 40 through 43 may move in a circumferential path in a plane into and out of the container and this path is in a plane, which is generally parallel to the sidewalls 25 and 26.

As will be noted from FIG. 1, the blades 40 through 43 each have a flat surface 48 arranged so that the flat surface extends generally transverse to the plane of the circumferential path of movement of the blades. Wall means define openings 50 in the end portions of each of the blades for the purpose of engaging bubble-making solution as the blades pass alternately into the container. The solution that is contained on the openings 50 will then produce a bubble when air is blown therethrough. Air flow producing means are provided in the nature of a fan 54 for exerting an air force against the flat surface 48 of the blades which is in a direction transverse to the direction of extent of the flat surface 48 and is, also, in a direction transverse to the extent of the pivot means 46. This causes rotation of the paddle wheel 36 and also produces a bubble through the openings 50 in the ends of the blades.

The fan 54 is provided with two mounting arms 55 each of which is bent into a U-shape at an end opposite to its connection to the fan 54 and this U-shape connection is adapted to be hung on one of the endwalls 29 and 30 to appropriately locate the fan 54. A brake member 57, shown best in FIG. 3, is also adapted for use with the apparatus 20 and is provided with an engaging member 58 as well as first and second legs 59 and 60. The first and second legs 59 and 60 are adapted to be slipped over one of the sidewalls 25 and 26 with the engaging member 58 located in the path of travel of one of the blades 40 through 43, which prevents rotation of the paddle wheel. The spring tension between the legs 59 and 60 maintains the brake secured to the appropriate sidewall, but this spring tension is such that the brake can be easily removed when desired by a user of the device.

A base 63 is provided for use with the bubble-making apparatus and the base has a top surface 65 from which extend four upstanding walls 64 suitably spaced so that the container 23 may rest on the top surface and be kept from lateral movement. The base 63 carries dry cell batteries 66, which are utilized to drive the electric motor 56 of the fan 54 by means of electrical conductors 67 connected through a switch 68, which switch may be used to alternately interrupt current flow to motor 56.

FIGS. 5 and 6 illustrate how the bubble-making apparatus 20 of the present invention may be attached to a suitable vehicle, for example a bicycle. It will be readily appreciated by those skilled in the art that the bubble-making apparatus may be secured to many types of vehicles and the bicycle has only been shown as one such device. The bicycle of FIG. 5 has been identified by the reference numeral 71 and in addition to the other conventional structure of a bicycle includes a steering column 72 sometimes referred to as the housing for the steering column. In any event, the means for connecting the bubble-making apparatus to the bicycle includes a horizontal cross arm 75, which has connected to one end thereof, namely the outer end, a base 76, which is adapted to receive the container 23 of the bubble-making apparatus. The base is simply secured by means of a bolt, washer and nut as shown in FIG. 6 and these connecting devices have not been identified. The other end of the horizontal cross arm is secured to the steering column of the bicycle by means of a first circular strap 77 which extends around the steering column and the fastening devices have not been identified. An angle brace member 78 is, also, provided and has one of its end portions connected to an intermediate portion of the horizontal cross arm and the other end of the same is secured to the steering column of the bicycle by means of a second circular strap 79 as shown.

It will be apparent to those skilled in the art that as the bicycle is ridden in the conventional manner, the movement of the bicycle through the air will produce the relative air movement that is required to operate the device 20. In other words, the movement of the bicycle along its normal path of travel replaces the function of the fan 54 in the embodiment of FIG. 1.

FIG. 7 discloses the structure of hand-held fan 82 which may be utilized for driving the bubble-making apparatus 20 shown in FIGS. 1 and 5 or it may be utilized in playing some of the games which will be disclosed hereinafter. In any event, the hand-held fan 82 includes a housing 83, which in addition to providing a hand support, also, serves the function of carrying the dry cell batteries (not shown) which are utilized to supply the electrical power to drive the fan portion of the device. The fan is identified by the reference numeral 84 and is driven by means of an electric motor 85 which is pivotally connected to the housing 83 through means of a friction-type pivotal connection 86. Switches 87 and 88 are provided for the purpose of providing the necessary directional rotation to the fan 84 and a lamp 90 which is turned on and off by means of a switch 91, also, forms part of the structure. A support member 93 is shown in FIG. 8 and includes first and second saddle members 94 and 95 and these saddle members serve to engage and support the housing 83 of the fan 82.

The structures of FIGS. 9, 10 and 11 are used in conjunction with the playing of various games by means of the use of bubbles which are produced by the apparatus of the present invention or in any other manner. Referring specifically to FIG. 9 there is illustrated a base member 98 which includes a post 99 having a pointed or sharpened end 100. The game which may be played by utilizing this particular structure includes the steps of producing a bubble from the place where it is made to a designated destination at which destination the device shown in FIG. 9 is located. The bubble or bubbles are moved along their path of travel by means of a hand-held fan as shown in FIG. 7 and the object is to impinge the bubble against the pointed end 100 to break the same. A typical example of the game would be with two participants who would attempt to move their own given bubble into engagement with the pointed end and the winner would be the one who first succeeded.

FIG. 10 illustrates another structure that may be located at the designated destination and includes a circular (hoop) member 103 having a hole 104 therein and supported by means of legs 105. This structure is in the nature of a basketball hoop-like target and the object of the game played using this structure is to direct a bubble from the place where made through the hole 104. FIG. 11 illustrates still another structure which may be utilized in playing a game with bubbles produced on the apparatus of the present invention and this includes an open grid 107 which is mounted on legs 108. The object of a game that may be played with this structure is to transport bubbles from a place where made to the grid 107 where they may be stacked or stored and the object may be to first locate a given number of bubbles at this destination. It will be apparent to those skilled in the art that any combination of the structures shown in FIGS. 9, 10 and 11 may be utilized in playing a game and they may constitute the structures to be located at various designated final and intermediate destinations. Many of the games to be played would have as their object the manipulation of bubbles through a course in the fastest possible manner.

It will be apparent to those skilled in the art that in order to operate the bubble-making apparatus shown in FIG. 1, one need fill the container 23 with a bubble-making solution at least to a height where the openings 50 in the blades will engage the solution as they rotate into and out of the container. The fan 54 is then turned on which not only causes rotation of the paddle wheel 36 by impingement of the air blast against the blades 40 through 43, but, also, produces air which travels through the openings 50 which produces bubbles. The relative air travel, of course, in the structure of FIG. 5 is produced by the vehicle traveling along its given path. It will, also, be appreciated by those skilled in the art that with the structure of FIG. 1 or FIG. 5, that the movement of the blades 40 through 43 through the bubble-making solution produces a braking or damping effect so that greater relative movement of the air through the openings 50 is produced. It will, also, be appreciated by those skilled in the art that as the blades 40 through 43 move up out of the bubble-making solution they come directly into the line of air flow from the fan 54 rather than traveling into the air flow in a lateral or transverse direction. The resulting bubbles and advantages of this type of structure will be apparent.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bubble-making apparatus including in combination a generally rectangularly shaped container having first and second spaced and generally parallel sidewalls and first and second spaced and generally parallel endwalls, the upper perimeter of said four walls defining an opening to said container, said container adapted to contain a bubble-making solution, a paddle wheel having four blades connected together at a central location and with adjacent blades being spaced from each other about ninety degrees, pivot means connected to said paddle wheel at said central location and extending to said first and second sidewalls to rotatably mount said paddle wheel whereby said blades move in a circumferential path into and out of said container, said path being in a plane generally to said sidewalls, each of said blades having a flat surface arranged so as to have its width extend generally transverse to the plane of said path, wall means defining an opening in the outward end portions of said blades, each said flat surface having a width upwardly of said end portion on the order of the same magnitude as the diameter of the associated said opening, and relative air flow producing means for exerting an air force against said flat surfaces of said blades in a direction transverse to said flat surfaces and, also, transverse to said pivot means to cause rotation of said paddle wheel and cause formation of bubbles at said openings when bubble-making solution is appropriately present thereat, said relative air flow producing means being the only means for rotatably moving said paddle wheel.

2. Apparatus as claimed in claim 1, wherein said relative air flow producing means comprises a fan to blow air against said blades to rotate said paddle wheel and move said blades into and out of said container and, also, to blow air through said openings in said blades to produce bubbles.

3. Apparatus as claimed in claim 2, wherein a brake member is attached to said container and is engageable with said paddle wheel to prevent rotation of the same.

4. Apparatus as claimed in claim 3, wherein a base is provided for said container, said base having upstanding walls on four sides to surround said sidewalls and endwalls of said container, said fan being battery powered and said base carrying batteries with electrical connection means connecting said batteries to said fan and switch means in said electrical connection means.

5. Apparatus as claimed in claim 1, wherein connection means are provided to connect said container to a vehicle such as a bicycle.

6. Apparatus as claimed in claim 5, wherein said connection means include a base secured to a horizontal cross arm at one end portion thereof, the other end portion being secured to the steering column of a bicycle, an angle brace member secured at one end to an intermediate portion of said horizontal cross arm and secured at its other end portion to the steering column of the bicycle.

7. A bubble-making apparatus including in combination a container, said container adapted to contain a bubble-making solution, a paddle wheel having radially extending blades connected together, central pivot means connected to said paddle wheel and extending to said container to rotatably mount said paddle wheel whereby said blades move in a circumferential path generally in a plane into and out of said container, each of said blades having a flat surface arranged so as to have its width extend generally transverse to the plane of said path, wall means defining an opening in the outward end portions of said blades, said flat surface having a width inwardly of said end on the order of the same magnitude as the diameter of the associated said opening, and relative air flow producing means for exerting an air force against said flat surfaces of said blades in a direction transverse to said flat surfaces and also transverse to said pivot means to cause rotation of said paddle wheel and cause formation of bubbles at said openings when bubble-making solution is appropriately present thereat, said relative air flow producing means being the only means for rotatably moving said paddle wheel.

8. Apparatus as claimed in claim 7, wherein said relative air flow producing means comprises a fan to blow air against said blades to rotate said paddle wheel and move said blades into and out of said container and, also, to blow air through said openings in said blades to produce bubbles.

* * * * *